United States Patent
Coulier (10) Patent No.: US 7,042,903 B2
(45) Date of Patent: May 9, 2006

(54) CONVEYING PROTOCOL UNITS FOR PORTABLE ELECTRONIC OBJECTS VIA A PROTOCOL FOR MICROCOMPUTER PERIPHERALS

(75) Inventor: Charles Coulier, Roquevaire (FR)

(73) Assignee: Gemplus, Gemenos Cedex (FR)

( * ) Notice: Subject to any disclaimer, the term of this patent is extended or adjusted under 35 U.S.C. 154(b) by 773 days.

(21) Appl. No.: 09/775,668

(22) Filed: Feb. 5, 2001

(65) Prior Publication Data

US 2001/0025882 A1    Oct. 4, 2001

(30) Foreign Application Priority Data

Feb. 3, 2000    (FR) ................................... 00 01399

(51) Int. Cl.
  *H04J 3/16*    (2006.01)
(52) U.S. Cl. .................. 370/466; 370/474; 710/65; 710/100
(58) Field of Classification Search ............ 370/474, 370/476, 465–466, 477, 389; 710/62, 103, 710/105, 313, 65, 100, 110, 305
See application file for complete search history.

(56) References Cited

U.S. PATENT DOCUMENTS

| | | | | |
|---|---|---|---|---|
| 5,983,292 A | * | 11/1999 | Nordstrom et al. | 710/54 |
| 5,987,530 A | * | 11/1999 | Thomson | 710/4 |
| 6,168,077 B1 | * | 1/2001 | Gray et al. | 235/375 |
| 6,356,968 B1 | * | 3/2002 | Kishon | 710/306 |
| 6,385,729 B1 | * | 5/2002 | DiGiorgio et al. | 713/201 |
| 6,389,029 B1 | * | 5/2002 | McAlear | 370/402 |
| 6,675,243 B1 | * | 1/2004 | Bastiani et al. | 710/105 |
| 6,710,893 B1 | * | 3/2004 | Hou et al. | 358/1.15 |

* cited by examiner

*Primary Examiner*—Ricky Q. Ngo
*Assistant Examiner*—Nittaya Juntima
(74) *Attorney, Agent, or Firm*—Buchanan Ingersoll PC (57) ABSTRACT

Application protocol data units are conveyed in a universal serial bus so that a portable electronic object such as a smart card can be recognized by a terminal, such as a microcomputer, as being a peripheral. The header and the data field, when such a data field exists, of each command are encapsulated in data fields of data packets of respective downlink transactions. The data field, when such a data field exists, and the trailer of each response are encapsulated in the data packet data field of at least one uplink transaction. By means of this bus link, the data rate between the terminal and the electronic object is higher, and a plurality of portable electronic objects can be connected to the terminal.

8 Claims, 6 Drawing Sheets

CONVEYING PROTOCOL UNITS FOR PORTABLE ELECTRONIC OBJECTS VIA A PROTOCOL FOR MICROCOMPUTER PERIPHERALS

BACKGROUND OF THE INVENTION

The present invention relates to application level connection between a terminal of the microcomputer type and a portable electronic object such as a smart card, sometimes referred to as a "microcontroller card" or as an "integrated circuit card", acting as a peripheral of the terminal.

At the application level, the interchange between a host station, such as a terminal, for hosting a smart card and the smart card takes place by means of Application Protocol Data Units (APDUs) which are commands transmitted by the terminal to the card and responses transmitted by the card to the terminal. The format of such commands and responses is defined at the application level by the ISO 7816-4 Standard and its appendices A and B for conveying protocol units using the half-duplex asynchronous transmission protocol in "T=0" characters or the half-duplex alternate transmission protocol in "T=1" blocks. The commands are always triggered by the terminal and the card must be of the pro-active type to transfer data on its own initiative to the terminal.

In addition, the "Universal Serial Bus Specification", September 1998, defines a standardized universal serial bus (USB) for connecting a microcomputer (e.g. a personal computer (PC)) to peripherals. All data transfers between the microcomputer and a peripheral are triggered by the microcomputer, the peripheral always being the slave of the microcomputer, unlike a smart card relative to the terminal. All of the transactions made via the USB are effected by means of packets whose formats and sequencing are different from those of the commands and responses defined by the ISO 7816-4 Standard for smart cards.

SUMMARY OF THE INVENTION

An object of the present invention is to adapt a portable electronic object to act as a peripheral of a microcomputer, and more precisely to convey APDUs over a USB so that the portable electronic object is recognized by a microcomputer as being a peripheral.

To this end, a method of conveying commands from a terminal to a portable electronic object, every command having a header, and some of the commands having a data field, and responses from the portable electronic object to the terminal, some of the responses having a data field, and every response having a trailer, is characterized by the following steps:

providing a bus between the terminal and the object for interchanging downlink transactions, each of which comprises successively a start packet transmitted from the terminal to the object, a data packet transmitted from the terminal to the object, and an end packet transmitted from the object to the terminal, and uplink transactions, each of which comprises a start packet transmitted from the terminal to the object, a data packet transmitted from the object to the terminal, and an end packet transmitted from the terminal to the object;

encapsulating the header and the data field, when such a data field exists, of each command respectively in the data fields of data packets respectively of a downlink transaction and of at least one downlink transaction; and encapsulating the data field, when such a data field exists, and the trailer of each response in the data field of the data packet of at least one uplink transaction.

By encapsulating the commands and the responses in transaction data packets, the invention makes it possible, when the portable electronic object is a smart card, to omit the reader of the card which is then connected to a universal serial bus (USB) standardized in compliance with the USB Standard. The invention also offers a high data rate that is higher than one megabit per second for interchange between the terminal and the card, and makes it possible to connect a plurality of smart cards, or more generally of portable electronic objects, to the terminal via a common bus.

Among the four transfer modes of the USB Standard, the invention shows that transactions complying with the "bulk transfer mode" and with the "control transfer mode" are particularly suitable for the operation of a portable electronic object.

For each of these two modes, the invention makes provision for each start packet to contain an identifier announcing the direction of the transfer of the data packet succeeding it in a transaction. The start packet of each downlink transaction relating to the transfer of at least a portion of the data field of a command or of a response may contain an identifier indicating the direction of the transfer of the data packet succeeding it in the transaction. The data field of a data packet in the downlink transaction containing the header of a command may also contain the expected length of the data field of the response succeeding the command and/or the length of the data field of the command. The data field of a data packet of an uplink transaction containing the beginning of the data field of a response may also contain the working length of the data field of the response. Padding bits, whose number is proportional to the difference between the expected length of the data field of the response included in a preceding command and the working length, may be contained in the data field of the data packet of the second uplink transaction containing the trailer of the response.

According to other characteristics of the invention for the control transfer mode, the start packet of the first downlink transaction in a sequence of a plurality of successive transactions relating to a command or to a response may contain an identifier announcing the beginning of the sequence. In this situation, the beginning of the data field of a data packet in the downlink transaction containing the header of a command contains an identifier of the format of the command. The uplink transaction containing the data packet in which the beginning of the response is encapsulated may precede a downlink transaction in which the start packet contains an identifier announcing the beginning of an uplink transaction sequence, and in which the data packet has a structure identical to the structure of the data packet of the downlink transaction containing the header of a command, and contains an identifier for identifying the format of the response, and the expected length of the data field of the response.

BRIEF DESCRIPTION OF THE DRAWINGS

Other characteristics and advantages of the present invention will appear more clearly upon reading the following description of preferred embodiments of the invention with reference to the corresponding accompanying drawings, in which.

DETAILED DESCRIPTION

Figure 1:
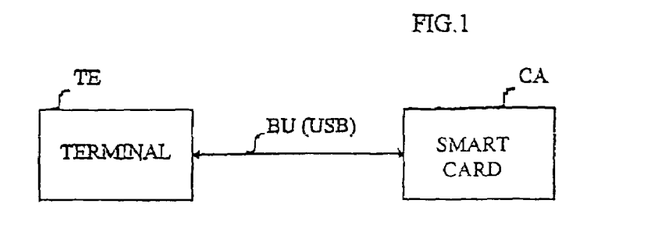
FIG. 1 is a block diagram of a connection between a terminal of the microcomputer type and a smart card via a USB.

With reference to FIG. 1, a terminal TE, such as a microcomputer (e.g. a personal computer) is connected to a portable electronic object, such as a smart card CA also referred to as an "integrated circuit card" or as a "microcontroller card", via a four-wire bus BU complying with the Universal Serial Bus (USB) Standard. The bus may be provided with one or more connection means (hubs) for connection to other peripheral devices such as a mouse, a keyboard, a printer, a graphics table, etc. The bus BU comprises two power supply wires and two packet transmission wires offering a data rate typically equal to 1.5 megabits per second (Mbit/s) or 12 Mbit/s.

The terminal encompasses the host computer system referred to as the "host" in the USB Standard, comprising a hardware and software controller ("host controller") acting in the terminal as an interface with the bus BU.

The smart card CA is a logic and physical peripheral device in the sense of "device" in the USB Standard, and is provided with an interface ("Device Endpoint") constituting a source of information and performing functions interfacing with the bus BU. The protocol layer of the smart card CA also includes a software entity which manages the standardized command-response protocol of the ISO 7816 Standard, and which communicates with the USB protocol interface in the smart card.

Figure 2:
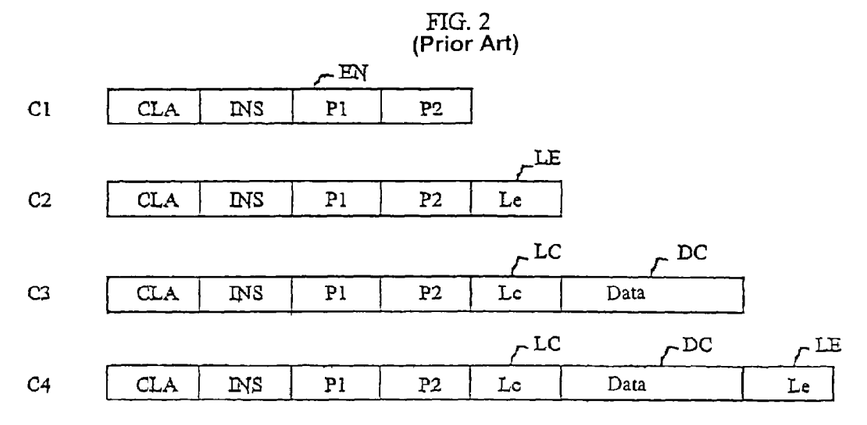
FIG. 2 is a diagram of four known command formats complying with the ISO 7816-4 Standard.

As shown in FIG. 2, an Application Protocol Data Unit (APDU) of the ISO 7816-4 Standard constitutes a command established by the terminal TE, to be transmitted to the smart card CA. The command contains a header EN having four bytes: namely one byte CLA designating a class of instruction contained in the following byte, one byte INS designating an instruction code related to a command of the operating system in the microcontroller of the smart card CA, and two bytes P1 and P2 designating parameters relating to the instruction. A command may further include at least one of the following successive fields after the parameter P2: a field LC containing the length Lc of the data field of the command expressed in number of bytes, a data field DC of variable length that can reach 256 or 65535 bytes, and a field LE containing the length Le expressed in number of bytes and expected in the data field DR of the response RES2 to the command.

As shown in FIG. 2, an APDU of the command type may have any one of the following four formats:

case 1, command C1: the card receives no incoming data, and therefore the length Lc is equal to 0, and it sends back no outgoing data in a response RES1, and therefore the length Le is equal to 0; the command C1 is then no more than the header EN;

case 2, command C2: the card receives no incoming data, and the length Lc is therefore equal to 0, but it does send back outgoing data in a response RES2, and therefore the length Le is different from 0; thus, the command C2 comprises the fields EN and LE;

case 3, command C3: the card receives incoming data and therefore the length of the data field Lc is different from 0, hence the presence of a data field DC, and it sends back no outgoing data in a response RES1, and therefore the expected length Le is equal to 0; the command C3 then comprises a header EN followed by the fields LC and DC; and case 4, command C4: the card receives incoming data but it also sends back outgoing data DR in a response RES2, and therefore the lengths Lc and Le are different from 0; the command C4 successively comprises all four fields EN, LC, DC, and LE.

Figure 3:
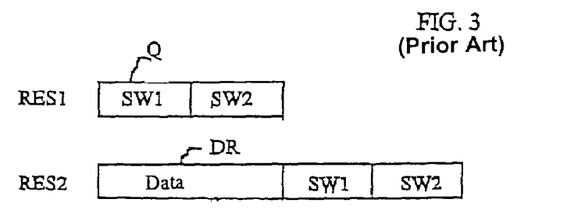
FIG. 3 is a diagram of two known card response formats complying with the ISO 7816-4 Standard.

As shown in FIG. 3, a response established by the card CA has one of the two formats RES1 and RES2. The response RES1 contains only a trailer Q having two "Status Word" bytes SW1 and SW2. The response format RES2 also contains a data field DR of variable length, preceding the trailer Q. When the card CA receives a command C1 or C3, it sends back a response RES1 containing only a trailer Q; when the card CA receives a command C2 or C4, it sends back a response containing a data field DR preceding the trailer Q and having a length that is no greater than the length Le announced in the command C2 or C4 preceding the response.

Figure 4:
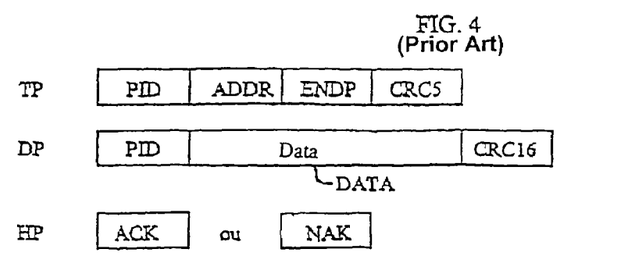
FIG. 4 is a diagram of three known types of USB packets.

With reference to the USB Standard for the universal serial bus BU, the three main types of packets of that Standard used to compose a transaction for transferring data in either direction between the terminal and the smart card are shown in FIG. 4. In the figure, the synchronization field (SYNC) containing a Start-of-Packet delimiter (SOP) an End-of Packet delimiter (EOP) at the beginning of each packet are not shown. The three types of packets are:

a start-of-transaction packet of the "Token Packet" type TP containing a one-byte packet identifier PID including the token type of the packet and the name of the packet, a seven-bit address field ADDR identifying the source or the destination of a data packet succeeding the token packet, a four-bit field or "Endpoint" ENDP containing the address of the function that is targeted in the card acting as a peripheral device, and a five-bit cyclic redundancy control field CRC5. Four token packets TP exist: an "OUT" packet for causing downlink data transfer from the terminal TE to the card CA, an "IN" packet for causing uplink data transfer from the card CA to the terminal TE, a "Start-of-Frame" or "SOF" packet for marking and indicating the number of token packets at the beginning of a frame containing a plurality of packets, and a "SETUP" or initialization packet for initializing synchronization between the terminal and the card at the beginning of a data transaction;

a "Data Packet" DP interposed between a token packet TP and an end packet or "Handshake Packet" HP in a transaction and containing an identifier field PID, a data field DATA containing no more than 1023 bytes, and a sixteen-bit cyclic redundancy control field CRC16. Two types of data packets DP are designated by identifiers DATA0 and DATA1 for distinguishing between data packets respectively of even rank and of odd rank during successive data transactions in a sequence complying with certain transfer modes; and an end-of-transaction or "Handshake Packet" HP containing only an identifier field PID for carrying forward the preceding data transfer status. These packets HP are of two types: an acknowledgment of receipt of data ACK which indicates that a preceding data packet DP has been received correctly, and a non-acknowledgment of receipt packet NAK which indicates that the receiver to which the data contained in the preceding data packet is addressed has not accepted it or that the transmitter which is to transmit the data cannot send it.

A peripheral complying with the USB Standard, such as the card CA, is entitled to transmit only on command from the terminal (Host) and only after it has received a token packet TP. A transaction, be it a downlink transaction for a command or an uplink transaction for a response, starts with a token packet TP transmitted by the terminal TE to the card CA. If the data requested by the packet TP is not available, the peripheral responds by using a packet NAK which indicates that the targeted function in the peripheral was not capable of accepting the data or that the designated function has no data to transmit.

In a first embodiment of the invention the APDUs are interchanged using the "Bulk Transfer" mode defined in compliance with the USB Standard between the terminal TE and the card CA. The bulk transfer mode is designed for devices that need to communicate relatively large quantities of data at very variable instants and by using any available bandwidth. In addition this bulk mode is relatively simple because it does not impose any structure on the contents of the data, and it uses only token packets TP of the OUT type for transferring data in the down direction from the terminal TE to the card CA, and token packets of the IN type for transferring data in the up direction from the card CA to the terminal TE.

The preceding characteristics of the bulk transfer mode make it a mode well suited to interchanging APDUs, as appears below with reference to FIGS. 5 to 8. Transactions using the bulk transfer mode are three-packet transactions comprising a token packet TP of the OUT or IN type, a data packet DATA0 or DATA1, and a handshake packet HP of the ACK or NAK type.

Figure 7:
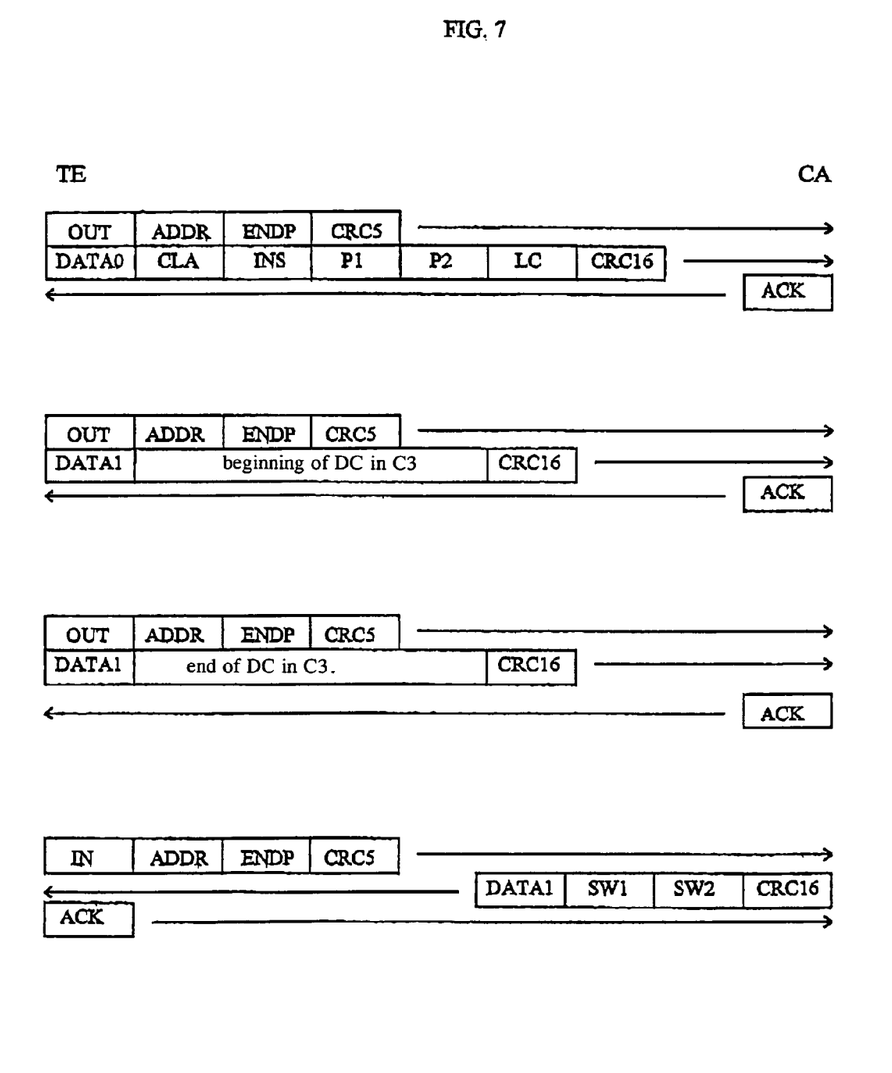
Figure 8:
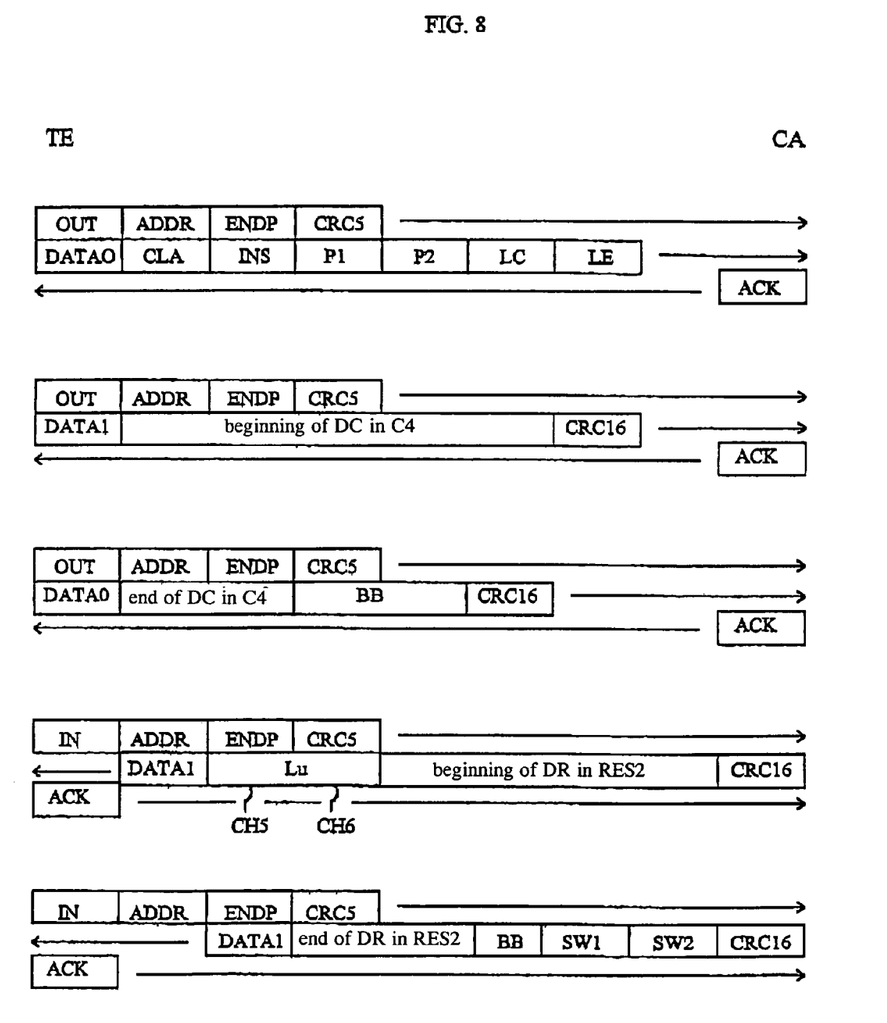
Figure 9:
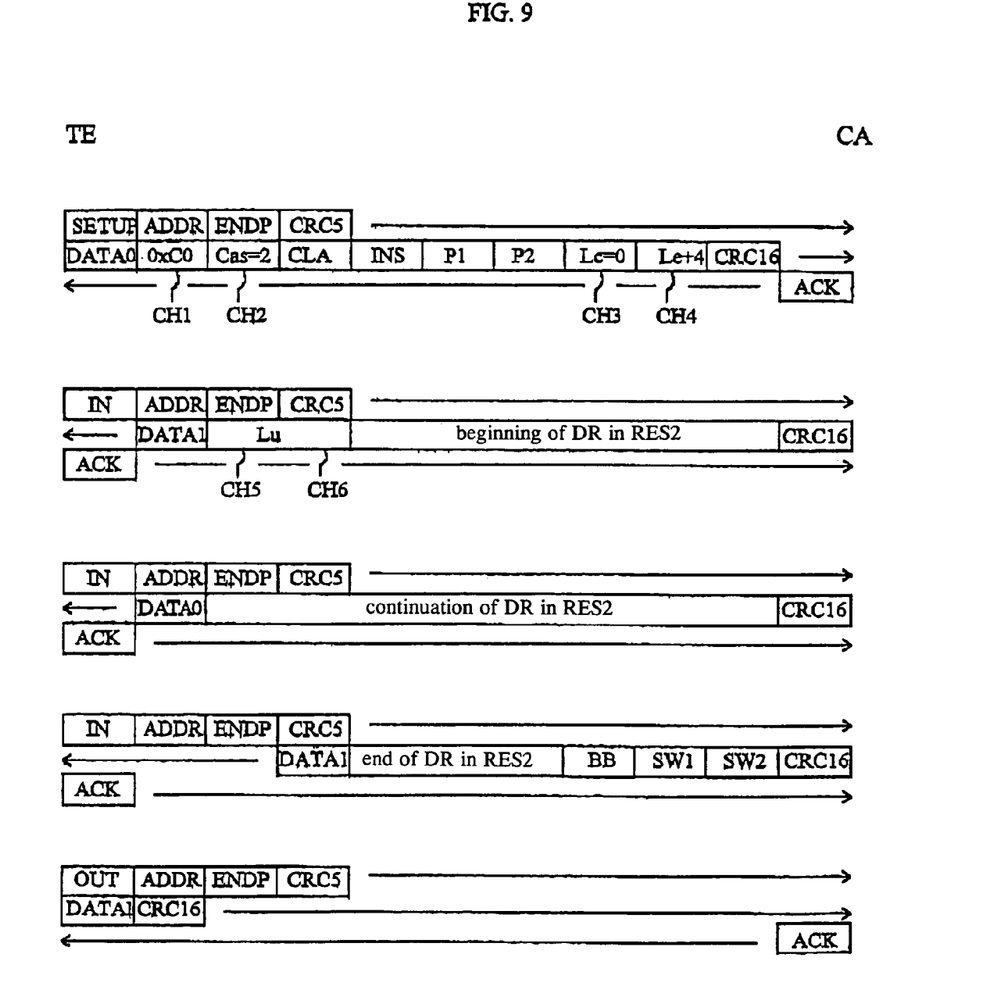
FIGS. 9 and 10 are respective transfer diagrams for command-response pairs for transfer by means of three-packet transactions in a second embodiment of the invention.
Figure 10:
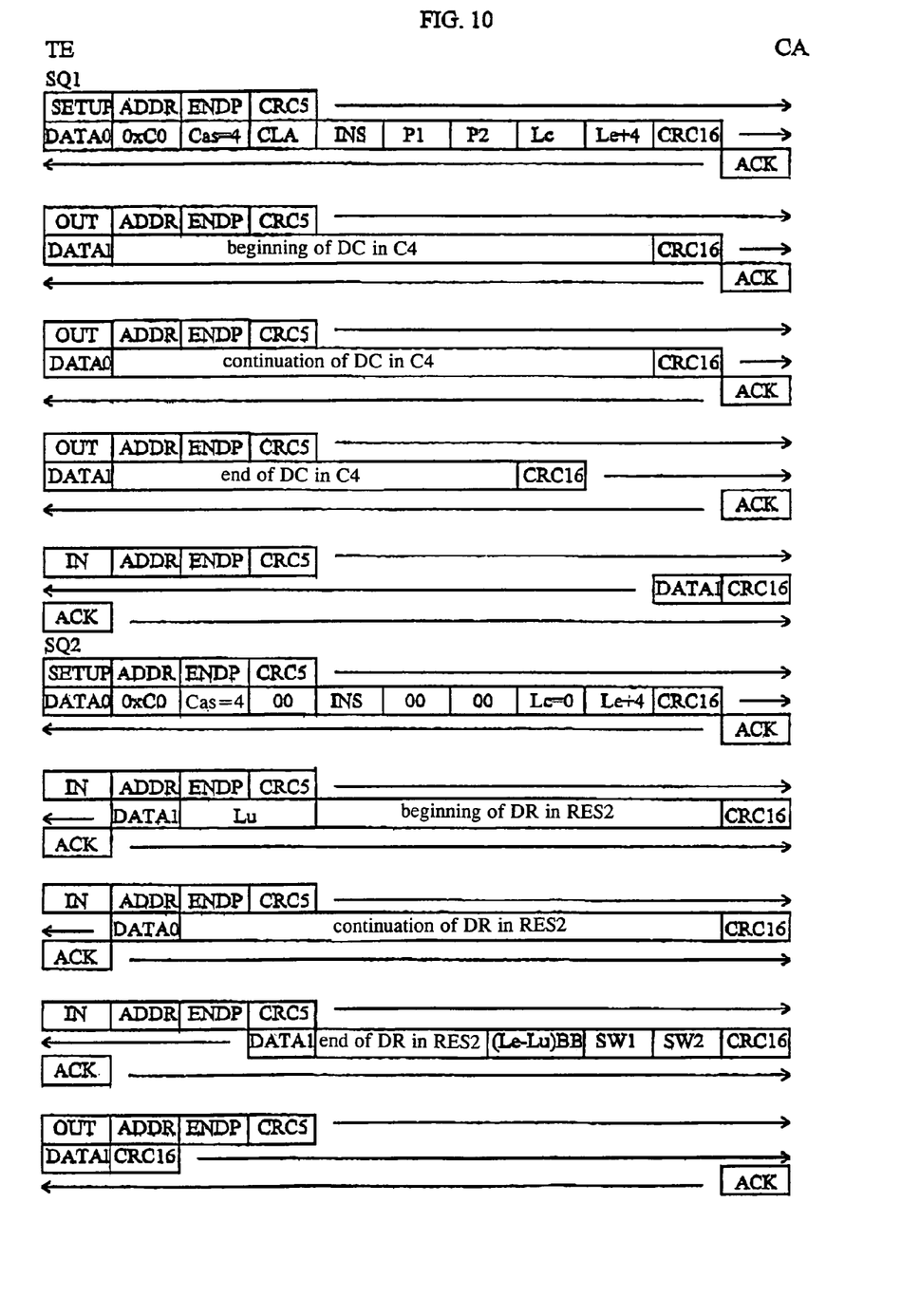

It is assumed in FIGS. 5 to 8 and also in FIGS. 9 to 10 that the handshake packet HP is always of the ACK type following correct reception of preceding data.

Figure 5:
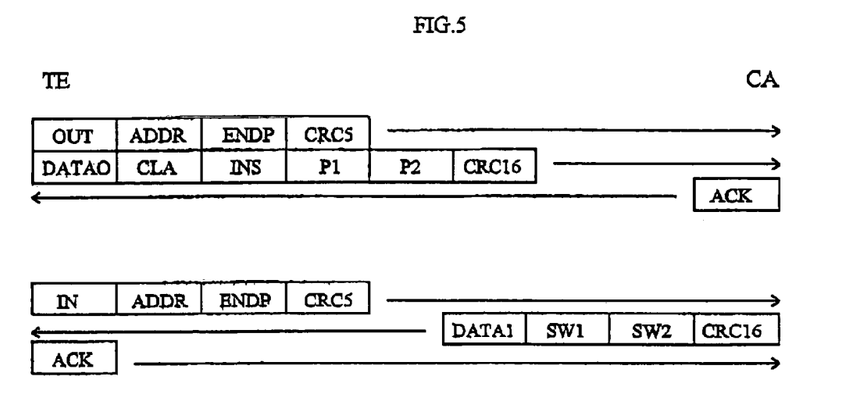
FIGS. 5 to 8 are respective transfer diagrams for command-response pairs shown in FIGS. 2 and 3 for transfer between the terminal and the smart card by means of three-packet transactions in a first embodiment of the invention.

When a command-response pair C1-RES1 as in case 1 is to be interchanged between the terminal and the card, six packets are interchanged successively in downlink and uplink transactions, as shown in FIG. 5. The downlink transaction contains an OUT token packet, a data packet DATA0 containing the header EN of the command C1 transmitted by the terminal to the card, and a handshake packet ACK indicating to the terminal that the card has received the data packet DATA0 correctly. The uplink transaction contains an IN token packet, a data packet DATA1 whose data field contains the 2-byte trailer SW1 and SW2 of the response RES1 and transmitted by the card to the terminal, and a handshake packet ACK indicating to the card that the packet DATA1 has been received correctly by the terminal.

Figure 6:
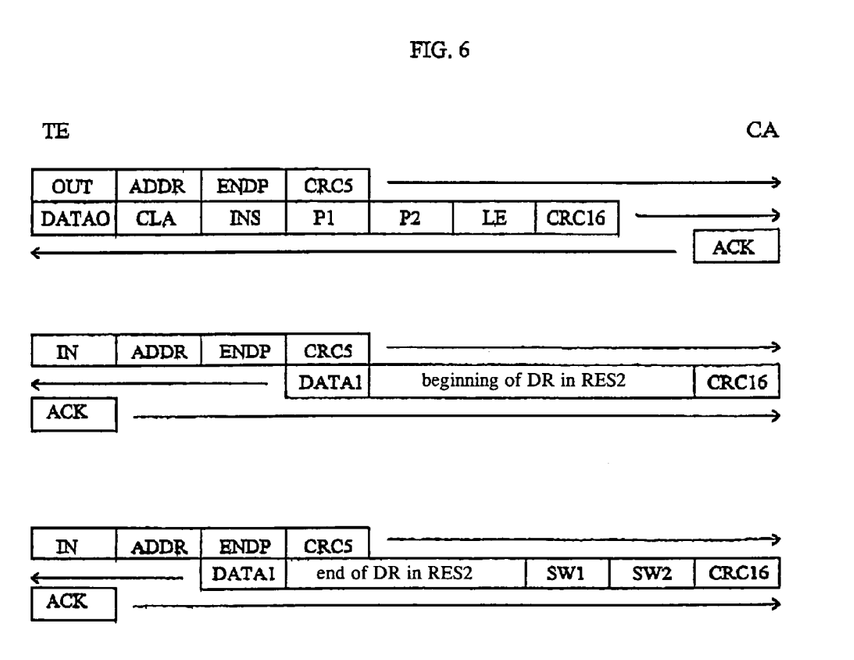

When a command C2 followed by a response RES2 with an outgoing data field are interchanged as in case 2 of the ISO 7816-4 Standard, a downlink transaction and one or more uplink transactions are interchanged between the terminal TE and the card CA, as shown in FIG. 6. The number of uplink transactions depends on the length Le of the data field DR in the response RES2 compared with the maximum length of the field DATA of the packets DP, which length can be pre-negotiated to be 8, 16, 32, or 64 bytes, for example, between the terminal TE and the card CA. It is assumed in FIG. 6 that the field DR is fragmented into two fields DATA so that the sequence comprises three transactions in all.

The downlink transaction of the case 2 illustrated contains an OUT token packet, a data packet DATA0 whose data field contains the four bytes of the header EN followed by one byte LE containing the length Le of the data in the response RES2, which data packet DATA0 is transmitted by the terminal to the card, and a handshake packet ACK acknowledging that the packet DATA0 has been received correctly and transmitted by the card to the terminal. The first of the two uplink transactions contains an IN token packet transmitted by the terminal, a data packet DATA1 transmitted by the card to the terminal and whose data field contains the beginning of the data field DR of the response RES2, and a handshake packet ACK transmitted by the terminal to the card when the terminal has received the packet DATA1 correctly. The second uplink transaction contains an IN token packet, a data packet DATA1 transmitted by the card to the terminal and having a data field DATA optionally containing the remainder of the data contained in the field DR of the response RES2 concatenated with the trailer Q comprising the two bytes SW1 and SW2 of the response RES2, and finally a handshake packet ACK transmitted by the terminal to the card in response to the correct packet DATA1.

An interchange of a command C3 with a response RES1 without data comprises, for example, two transactions for transmitting the command data DC and thus it comprises three downlink transactions and one uplink transaction, as shown in FIG. 7. The first downlink transaction is analogous to the first transaction shown in FIG. 6, and it contains an OUT token packet, a data packet DATA0, and a handshake packet ACK, but the data field in the packet DATA0 comprises the header EN and the length field LC of the command C3. The two other downlink transactions are of the same type, and each of them contains an OUT packet so as to cause the command data to be transferred from the terminal TE to the card CA, a data packet DATA1 whose data field contains the beginning or the end of the data field DC of the command C3, transmitted from the terminal to the card, and a handshake packet ACK transmitted by the card to the terminal in response to a correct preceding data packet DATA1. The last transaction is similar to the last uplink transaction shown in FIG. 6 and contains an IN token packet transmitted by the terminal to the card, a data packet DATA1 whose data field contains only the two bytes SW1 and SW2 of the trailer Q of the response RES1 and which is transmitted by the card to the terminal, and a handshake packet ACK transmitted by the terminal.

When a command C4 is to be transmitted by the terminal to the card, then, for example, three downlink transactions and two uplink transactions are interchanged between the terminal and the card, as shown in FIG. 8. In the first transaction, a data packet DATA0 is transmitted by the terminal to the card after an OUT token packet has been transmitted, and it contains in its data field DATA the header EN, the command length field LC and the expected length field LE taken from the command C4, and it is followed by a handshake packet ACK transmitted by the card to the terminal when the preceding packet DATA0 is correct. Each of the following two downlink transactions comprises (a) an OUT packet so as to cause portions of the data field DC of the command C4 to be transferred from the terminal to the card, (b) a data packet DATA1 or Data0 whose data field DATA contains a first portion, or an intermediate portion, or an end portion of the data field DC of the command C4, transmitted by the terminal to the card, and (c) a handshake packet ACK transmitted by the card to the terminal when the preceding data packet has been received correctly by the card. The two uplink transactions concern the transfer of the data of the field DR of the response RES2 as requested by the command C4. The first uplink transaction contains an IN token packet transmitted by the terminal, then a data packet DATA1 containing the beginning of the data field DR of the response RES2 transmitted by the card to the terminal, and a handshake packet ACK transmitted by the terminal to the card. The second uplink transaction contains an IN token packet transmitted by the terminal, a packet DATA1 whose data field optionally contains the end of the outgoing data from the card, contained in the field DR of the response RES2 as well as the trailer Q having 2 bytes SW1 and SW2 of the response RES2, and a handshake packet ACK transmitted by the terminal to the card.

In the example shown in FIG. 8, fields CH5 and CH6 preceding the beginning of the data field DR of the response RES2 in the data packet DATA1 of the first uplink transaction indicate the working length Lu of that data in the field DR of the response RES2 which is actually transmitted, it being possible for Lu to be less than or equal to the expected length Le indicated by the command C4. Although the length of the data requested in the expected response is declared as of the beginning of the sequence, in the field LE of the packet DATA0 during the preceding first downlink transaction, it is preferable, in the event that an incident or an error is detected by the card CA, invalidating all or some of the data to be transmitted to the terminal TE, to indicate to the terminal the length Lu of the data actually transmitted by the response RES2. When Lu<Le, the data field DR of length Le is terminated by non-significant padding bits BB of quantity (Le−Lu) and solely serving to comply with the protocol rules. Thus, the data field of the data packet DATA1 of the first uplink transaction in FIG. 8 contains the working length Lu and the beginning of the data field DR of the response RES2, and the data field of the data packet DATA1 of the second uplink transaction contains the end of the data field DR of the response RES2 optionally followed by (Le−Lu) bytes of padding bits BB, and followed by the two bytes SW1 and SW2 of the trailer Q of the response RES2.

The above-described variant with fields CH5 and CH6 and padding bits BB is also applicable to the two uplink transactions containing a response RES2 to the command C2 of the transaction of FIG. 6.

In a second embodiment, the command-response pairs of the ISO 7816-4 Standard are interchanged between the card CA and the terminal TE in the "Control Transfer" mode of the USB Standard.

The control transfer mode is used particularly for initializing peripherals in compliance with the USB Standard. This mode is thus recognized by all controllers, which makes it advantageously applicable, in the invention, to a smart card.

As in the above-described bulk transfer mode, in accordance with the invention the APDUs, i.e. the commands and their responses, are encapsulated in data packets DP in compliance with the USB Standard during transactions. Each downlink transaction relating to the transfer of at least a portion of a command C1 to C4 or each uplink transaction relating to the transfer of a portion of a response RES1, RES2 comprises three packets, namely a token packet TP transmitted by the terminal to the card, then a data packet DP transmitted by the terminal for a command or by the card for a response, and a handshake packet HP normally of the ACK type transmitted by the entity (the terminal or the card) that has received the preceding data packet DP correctly. As stated above, each transaction is associated with a only one data transfer direction, either the down direction from the terminal to the card and indicated by a token packet with an OUT identifier, or the up direction from the card to the terminal and indicated by a token packet with an IN identifier.

In the control transfer mode, a sequence of a plurality of transactions is defined by three stages, namely a "Setup Stage", a "Data Stage", and a "Status Stage".

The setup stage defines the direction of transfer and the length of the data to be transferred so as to facilitate decoding of the transactions in the following data step. For the purpose of optimizing interchange of the invention, the header EN of a command C1 to C4 is always contained in the data packet DP with the identifier DATA0 during the setup stage, by making use of the encoding freedom offered by the USB Standard.

When the data stage exists, it comprises one or more OUT transactions in the down direction for data belonging to a command C3 or C4, or one or more IN transactions in the up direction for data belonging to a response RES2. The quantity of data that is specified with the transfer direction during the preceding setup stage may be distributed over a plurality of transactions as a function of the pre-negotiated data packet size which is generally considerably smaller than the maximum size of the fields DC and DR. Thus, each data stage corresponds to a one-way data transfer.

The status stage of the control transfer mode closes the three-stage sequence. It always uses a data packet DP of the DATA1 type, and it announces the change of data traffic direction relative to the preceding stage. If, for example, the preceding data stage consists in an OUT transfer in the down direction, the following status stage concerns an IN transaction in the up direction.

In the invention, for the command-response pairs of the ISO 7816-4 Standard:

- the header of a command or of a command that is simulated to initiate a response is always encapsulated in the packet DATA0 of a setup stage;
- the downlink data DC in a command C3 or C4 is encapsulated in at least one packet DP of an intermediate data stage;
- the uplink data DR in a response RES2 to a command C2 or C4 is encapsulated in at least one packet DP in an intermediate data stage; and
- the trailer Q constituted by the two status words SW1 and SW2 of a response RES1, RES2 is encapsulated in a data packet of the last transaction of the above-mentioned intermediate data stage preceding a status stage at the end of a sequence.

The cases 1 and 2 corresponding to the commands C1 and C2 then comprise a single sequence with one or more uplink transactions of the IN type for encapsulating a response without or with data, and the cases 3 and 4 corresponding to the commands C3 and C4 comprise a first sequence SQ1 with one or more downlink transactions of the OUT type for encapsulating the data field DC of the command C3 or C4, and then a second sequence SQ2 with an uplink transaction of the IN type for encapsulating a response RES1 without data for case 3, or with one or more uplink transactions for encapsulating the data field DR of the response RES2 for case 4.

By way of example, FIG. 9 shows a sequence in control transfer mode for a command C2 with a response RES2 whose data field DR is distributed in data packets DP with respective identifiers DATA1, DATA0, and DATA1 in three uplink transactions of the intermediate data stage.

The setup stage constitutes a first uplink transaction of the sequence, and comprises a SETUP packet and a DATA0 packet transmitted by the terminal to the card, and a packet ACK transmitted by the card in response to the packet DATA0 having been correctly received. The packet DATA0 encapsulates not only the four bytes CLA, INS, P1, and P2 of the header EN of the command C2, but it also includes two fields CH1 and CH2 preceding the class field CLA after a field identifier PID of the SETUP type, and two fields CH3 and CH4 succeeding the parameter field P2 before the control field CRC16.

The field CH1 indicates to the card that the following five bytes CH2, CLA, INS, P1, and P2 which succeed it in the data field of the packet DATA0 are proprietary bytes. The field CH2 contains a format identifier for indicating to the card the format of the command or of the response that the sequence in progress is transmitting.

The fields CH3 and CH4 respectively contain the length Lc of the data field DC of the command and the expected length Le of the data field DR of the response plus 4, respectively read from the fields LC and LE, when they exist, in the command to be transmitted. In this example, for the command C2, Lc is equal to 0 and Le is different from 0. The digit 4 added to the length Le counts two fields CH5 and CH6 which are included in the beginning of the data field of the first packet DATA1 of the following data stage, and which precede the beginning of the data field DR of the response RES2, and the two bytes SW1 and SW2 in the trailer Q of the response RES2.

The data stage comprises three uplink transactions in the example shown in FIG. 9. Each transaction comprises a token packet of the IN type for initiating a data transfer from the card CA to the terminal TE, a data packet DATA1 or DATA0 containing a portion of the field DR of the response RES2 and transmitted by the card to the terminal, and a handshake packet ACK confirming to the card that the preceding data packet transmitted by it has been received correctly by the terminal.

The fields CH5 and CH6 preceding the beginning of the data field DR of the response RES2 in the first data packet DATA1 indicate, as described with reference to FIG. 8, the working length Lu of that data in the field DR of the response RES2 which is actually transmitted to the terminal TE, it being possible for Lu to be less than or equal to Le. When Lu<Le, the data field DR of length Le is terminated by non-significant padding bits BB of quantity (Le−Lu). Thus, in the example shown in FIG. 9, the second uplink transaction in the intermediate data stage comprises an IN packet, a data packet DATA0 whose field DATA contains an intermediate portion of the data field DC of the response RES2, and a handshake packet ACK; the last transaction of the data stage comprises, after an IN packet, a data packet DATA1 whose data field DATA contains the end of the data field DR of the response RES2 optionally followed by (Le−Lu) bytes of padding bits BB, and followed by the two bytes SW1 and SW2 of the trailer Q of the response RES2, and also a handshake packet ACK.

The status stage terminating the sequence shown in FIG. 9 is constituted by a downlink transaction in the direction opposite the IN data uplink transactions executed previously. This downlink transaction comprises an OUT token packet transmitted by the terminal TE to the card CA, a packet DATA1 without any data field transmitted by the terminal to the card, and a handshake packet ACK acknowledging that the preceding packet DATA1 transmitted by the card to the terminal has been received correctly.

In the example shown in FIG. 9, it is assumed that the data requested by the command C2 in the setup stage was available in the card, and that the card was therefore able to re-transmit it in an encapsulated response RES2. Otherwise, in the second transaction, the card responds with a handshake packet HP of the NAK type to the first IN packet transmitted by the terminal, so as to indicate to the terminal that the requested data is not ready to be transmitted.

In the case of the command C1, the sequence comprises the setup stage having a SETUP token packet as shown in FIG. 9, a data stage comprising only one IN transaction with a data packet DATA1 whose data field contains only the bytes SW1 and SW2 of the response RES1, and the status stage having an OUT token packet as shown in FIG. 9.

With reference to FIG. 10, an interchange of a command C4 and of a response RES2 with data in control transfer mode comprises a first sequence SQ1 of the OUT type with a setup stage, a data stage having at least one OUT downlink transaction, e.g. three downlink transactions as shown in FIG. 10, and a status stage, and a second sequence SQ2 of the IN type with a setup stage, a data stage having at least one uplink transaction IN, e.g. three uplink transactions as shown in FIG. 10, and a final status stage.

In the first sequence SQ1, the first downlink transaction constituting the setup stage SETUP is analogous to the transaction described above with reference to FIG. 9, except that, at the beginning of the data field of the first data packet DATA0, the field CH2 contains an identifier of the fourth APDU format corresponding to the command C4 being transmitted, and the field CH3 contains the length Lc of the control data contained in the field LC of the command C4. Then each of the three downlink transactions of the data stage in the first sequence comprises an OUT token packet transmitted by the terminal to the card, a data packet DATA1 or DATA0 transmitted by the terminal to the card, and a handshake packet ACK transmitted by the card to the terminal in response to the preceding data packet being received correctly. The data DC of the command C4 progressively fills to their maximum length the data fields in the alternately transmitted data packets DATA0 and DATA1; e.g. if the maximum length of the data field of the data packets DP has been negotiated to be 8 bytes, the data fields of the packets DATA1, DATA0, and DATA1 in the first sequence respectively contain 8 bytes, 8 bytes, and 6 bytes for a data field DC containing 22 bytes.

Since the preceding data stage in the first sequence SQ1 comprises transactions of the OUT type, the status stage terminating the first sequence is then an IN uplink transaction and it comprises a token packet TP of the IN type transmitted by the terminal to the card, a data packet DATA1 without any data field transmitted by the card to the terminal, and a handshake packet ACK transmitted by the terminal to the card.

In addition to comprising a setup stage, the second sequence SQ2 of the interchange shown in FIG. 10 further comprises a data stage having three uplink transactions of the IN type for transmitting the response RES2, and a status stage analogous to the sequence shown in FIG. 9.

The data packet DATA0 after the token packet SETUP in the downlink transaction that constitutes the setup stage of the second sequence SQ2 has a structure identical to the structure of the packet DATA0 in the first downlink transaction of the first sequence SQ1. The field CH2 indicates the second response format with data in compliance with the response RES2 to the command C4, the fields CLA, P1, P2, and CH3 contain zeros and the field CH4 contains the length Le of the data that the response RES2 must contain, plus the digit 4. This digit 4 corresponds to the field CH5–CH6 (comprising two bytes in this example) for the working length Lu of the response and to the trailer comprising two bytes SW1 and SW2. When the working length Lu contained in the fields CH5 and CH6 at the beginning of the data field DATA of the data packet DATA1 of the IN first transaction in the data stage of the second sequence SQ2 is shorter than the expected length Le, the data field DATA of the data packet DATA1 of the last IN transaction in the data stage contains (Le–Lu) bytes of padding bits BB preceding the two bytes SW1 and SW2 of the trailer Q of the response RES2.

What is claimed is:

1. A method of conveying commands from a terminal to a portable electronic object, every command having a header, and some of the commands having a data field, and responses from the portable electronic object to the terminal, some of the responses having a data field, and every response having a trailer, said method comprising the following steps:

interchanging transactions by means of a bus between the terminal and the object, each downlink transaction comprising successively a token packet transmitted from the terminal to the object, a separate data packet transmitted from the terminal to the object, and a handshake packet transmitted from the object to the terminal, and each uplink transaction comprising a token packet transmitted from the terminal to the object, a data packet transmitted from the object to the terminal, and a handshake packet transmitted from the terminal to the object;

encapsulating the header of each command in a data field of the data packet of a downlink transaction, and the data field of a command, when such a data field exists, in the data field of at least one downlink transaction; and encapsulating the data field, when such a data field exists, and the trailer of each response in the data field of the data packet of at least one uplink transaction.

2. A method according to claim 1, in which each of said token packets contains an identifier indicating the direction of the transfer of the data packs succeeding it in a transaction.

3. A method according to claim 2, in which the token packet of each transaction relating to the transfer of at least a portion of the data field of a command or of a response contains an identifier indicating the direction of the transfer of the data packet succeeding it in said transaction.

4. A method according to claim 1, in which the token packet of a first transaction in a sequence of a plurally of successive transactions each providing a portion of a command or a response contains an identifier announcing the beginning of the sequence.

5. A method according to claim 1, in which the data field of a data packet in the downlink transaction containing the header of a command also contains the expected length of the data field of a response succeeding said command and/or the length of the data field of said command.

6. A method according to claim 1, wherein the data field of a data packet of an uplink transaction containing the beginning of the data field of a response also contains the working length of the data field of said response, and wherein padding bits, whose number is proportional to the difference between the expected length of the data field of said response included in a preceding command and the working length, are contained in the data field of the data packet of the second uplink transaction containing the trailer of said response.

7. A method according to claim 1, in which the beginning of the data field of a data packet in the downlink transaction containing the header of a command also contains an identifier of the format of the command.

8. A method according to claim 1, in which the uplink transaction containing the data packet in which the beginning of the response is encapsulated is preceded by a downlink transaction in which the token packet contains an identifier indicating the beginning of an uplink transaction sequence, and wherein the data packet of said uplink transaction has a structure identical to the structure of the data packet of a downlink transaction containing the header of a command, and contains an identifier for identifying the format of said response, and the expected length of the data field of said response.

\* \* \* \* \*